United States Patent
Ranasinghe et al.

(10) Patent No.: US 6,412,285 B1
(45) Date of Patent: Jul. 2, 2002

(54) COOLING AIR SYSTEM AND METHOD FOR COMBINED CYCLE POWER PLANTS

(75) Inventors: Jatila Ranasinghe, Niskayuna; William George Carberg, Saratoga Springs, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/681,868

(22) Filed: Jun. 20, 2001

(51) Int. Cl.[7] .............................. F02C 6/08; F02C 7/18
(52) U.S. Cl. .................... 60/782; 60/39.182; 60/806
(58) Field of Search .................... 60/39.02, 39.07, 60/39.182, 39.75, 728, 782, 806

(56) References Cited

U.S. PATENT DOCUMENTS

| | | | |
|---|---|---|---|
| 4,261,166 A | * 4/1981 | Mayrhofer | 60/39.182 |
| 5,329,758 A | * 7/1994 | Urbach et al. | 60/39.07 |
| 5,491,971 A | 2/1996 | Tomlinson et al. | 60/39.182 |
| 5,697,208 A | * 12/1997 | Glezer et al. | 60/39.07 |
| 5,873,234 A | * 2/1999 | Bruckner et al. | 60/39.182 |
| 6,018,942 A | 2/2000 | Liebig | 60/39.182 |
| 6,145,295 A | 11/2000 | Donovan et al. | 60/39.182 |
| 6,295,803 B1 | * 10/2001 | Bancalari | 60/39.75 |
| 6,298,656 B1 | * 10/2001 | Donovan et al. | 60/39.182 |

* cited by examiner

*Primary Examiner*—Ted Kim
(74) *Attorney, Agent, or Firm*—Nixon & Vanderhye PC

(57) ABSTRACT

A cooled cooling air (CCA) system is provided for application with gas turbine cycles. In an embodiment of the invention, the CCA system includes a shell and tube heat exchanger in which water flow is provided inside the tube(s) and air flow is provided on the shell side. Water exiting the heat exchanger is partially evaporated. Accordingly, the resulting two phase water/steam flow is admitted to a separator where the steam and water are separated. The saturated steam is flowed to the HRSG whereas the separator water is recycled to the heat exchanger.

15 Claims, 2 Drawing Sheets

COOLING AIR SYSTEM AND METHOD FOR COMBINED CYCLE POWER PLANTS

BACKGROUND OF INVENTION

The present invention relates to gas turbine cycles employing a cooled cooling air (CCA) system for cooling hot compressor air extracted for cooling turbine or compressor parts.

In modern high efficiency gas turbine cycles, hot compressor air is extracted for cooling compressor and turbine parts. Reliability concerns, control difficulty and the high cost of current CCA systems have made it apparent that there is a need for an improved CCA system design.

FIG. 1 schematically illustrates a combined cycle system having a state of the art cooled cooling air system (hereafter CCA system) for cooling hot compressor air extracted for cooling turbine and compressor parts. In the illustrated power plant, a gas turbine system 10 is provided comprising a compressor 14, a combustion system 18 and a gas turbine expander 24; and a steam turbine system schematically shown at 34. More specifically, ambient air 12 enters the axial flow compressor 14 and the thus produced compressed air 16 enters the combustion system 18 where fuel 20 is injected and combustion occurs. The combustion mixture 22 leaves the combustion system 18 and enters the turbine 24. In the turbine section, energy of the hot gases is converted into work. This conversion takes place in two steps, the hot gases are expanded and a portion of the thermal energy is converted into kinetic energy in the nozzle section of the turbine. Then, in the bucket section of the turbine, a portion of the kinetic energy is transferred to the rotating buckets and converted to work, e.g. rotation of shaft 26. A portion of the work developed by the turbine is thus used to drive the compressor 14, whereas the remainder is available for, e.g., an electrical generator or mechanical load 28. Hot exhaust gas 30 leaves the turbine and flows to a heat recovery unit. The heat recovery unit may take the form of any one of a variety of known heat exchange systems including, for example, an otherwise conventional multi-pressure heat recovery steam generator (HRSG) 32.

In the illustrated configuration, the gas turbine system 10 and the steam turbine system 34 each drive a respective generator (or other load) 28, 36. The steam turbine system 34 is associated in a conventional manner with the multi-pressure HRSG 32. Thus, steam 38 flows to/from the steam turbine system 34, the steam turbine system 34 exhausts to a condenser 40, and condensate is fed from condensor 40 to HRSG 32 via conduit 42 with the aid of a condensate pump 44. The condensate passes through the various components of the HRSG 32. Only the low pressure evaporator 46, intermediate pressure evaporator 48 and high pressure evaporator 50 are illustrated in this example, it being well understood that various economizers, superheaters and associated conduits and valves are conventionally provided in an HRSG and are simply omitted as not directly relevant to the discussion herein.

As noted above, heat is provided to the HRSG 32 by the gas turbine exhaust gases 30 that are introduced into the HRSG 32 and exit the HRSG at 52 for passage to a stack (not shown). The further discussion of this conventional system will be generally limited to those components provided as a part of the associated CCA system 54.

In the illustrated CCA system 54, hot compressor air is extracted, as schematically shown by conduit 56, at temperatures of for example 850 to 900° F., and is cooled to a temperature of about 500 to 550° F. in a kettle reboiler type shell and tube heat exchanger 58. The kettle reboiler 58 has a U-tube bundle 60, schematically shown as tube, immersed in a pool of water 62 on the shell side, with the hot compressor air in the tube. The hot air flowing in the tubes causes boiling in the pool 62 and the saturated steam 64 produced is admitted to the intermediate pressure (IP) evaporator 48 steam drum in the heat recovery steam generator (HRSG) 32. IP economizer discharge water 66 is admitted to the shell of the reboiler 58 as makeup for the steam 64 generated. The cooled air 68 leaving the CCA heat exchanger 58 is used for cooling compressor and/or turbine parts, as schematically shown by conduits 70 and 72. A by-pass 74 on the air side is also provided to control the air temperature leaving the CCA system 54. Since the CCA system has to be designed for low system air side pressure drop, for power cycle thermal efficiency considerations, a two pass U-tube bundle is typically used.

SUMMARY OF INVENTION

There are several potential areas for improvement in regard to the CCA system described above.

The two pass tube side design described above results in one half of the tube-sheet being exposed to the incoming hot air, while the other half is exposed to cooled air leaving the heat exchanger on the air-side. This results in high thermal stresses on the tube sheet. While a single pass kettle reboiler would overcome this issue, a single pass design would require a shell expansion joint or a sliding tube sheet, which are a reliability concern.

Accurate water level control on the shell-side is required to prevent excessive carry over of water in the saturated steam and to prevent the uncovering of tubes in the water pool and exposing water to the hot air tubes only transiently. In that regard, drum level is typically calculated with measured differential pressure in the drum and calculated density of the drum water. However, there are steam bubbles in the boiling pool of water and an accurate calculation of the void fraction is required for an accurate density and level calculation. Calculation of void fraction is challenging in this type of application, especially in transient situations.

In addition, as noted above, the air side has to be designed for low pressure drop. Hence, the velocity of the air in the tubes is low resulting in low heat transfer coefficients on the air side. Heat exchanger size can be advantageously reduced by applying extended surfaces (such as fins) on the low heat transfer side. Extended surfaces can be economically applied on the outside tube surfaces.

The invention provides a CCA system for application with modern gas turbine cycles that overcomes the reliability, control and cost concerns identified above.

More specifically, in an embodiment of the invention, the CCA system includes a shell and tube heat exchanger in which water flow is provided inside the tubes and air flow is provided for on the shell side of the heat exchanger. In such a system, the water exiting the heat exchanger is partially evaporated. Accordingly, as a further feature of the invention, the resulting two phase water/steam flow is admitted to a separator/flash drum where the steam and water are separated. The saturated steam leaving the separator is flowed to the HRSG whereas the separator water is admitted to the heat exchanger, generally after being pumped to a higher pressure by recirculating water pumps.

Because air flow is provided outside the tubes, finned tubes may be provided to reduce the total heat exchanger size.

Thus, the invention is embodied in a combined cycle power plant comprising a combustion turbine system having a compressor for producing compressed air, a combustor for combusting a fuel in the compressed air to produce combustion air, and a gas turbine for expanding the combustion air to produce mechanical energy and exhaust gas; a steam generator having an inlet for receiving the exhaust air and a plurality of sections located sequentially in a flow path of the exhaust gas for removing heat from the exhaust gas to produce at least one steam flow; a steam turbine system for receiving the at least one steam flow; and a cooling air flow path for directing a compressed air fraction from the compressor to at least one of the compressor and the gas turbine for cooling a portion thereof; wherein the cooling air flow path comprises a heat exchange system for receiving the compressed air fraction and for removing heat therefrom to produce a heated fluid flow and a cooled compressed air flow, wherein the heat exchange system comprises a chamber having a compressed air inlet and a compressed air outlet and at least one tube for flowing water for heat exchange with hot compressed air disposed in the chamber.

The invention is also embodied in a method of operating a combined cycle power plant having a combustion turbine system, a heat recovery steam generator, and a steam turbine system, the method comprising the steps of providing a heat exchange system comprising a chamber having a compressed air inlet and a compressed air outlet and at least one tube for flowing water for heat exchange with hot compressed air disposed in the chamber; operating the combustion turbine system to burn a fuel to produce hot compressed air, mechanical energy, and a flow of exhaust gas; directing a portion of the hot compressed air through the heat exchange system to produce a flow of cooled compressed air and a heated fluid flow; and directing the flow of cooled compressed air to cool a portion of the combustion turbine system.

BRIEF DESCRIPTION OF DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION

Figure 1:
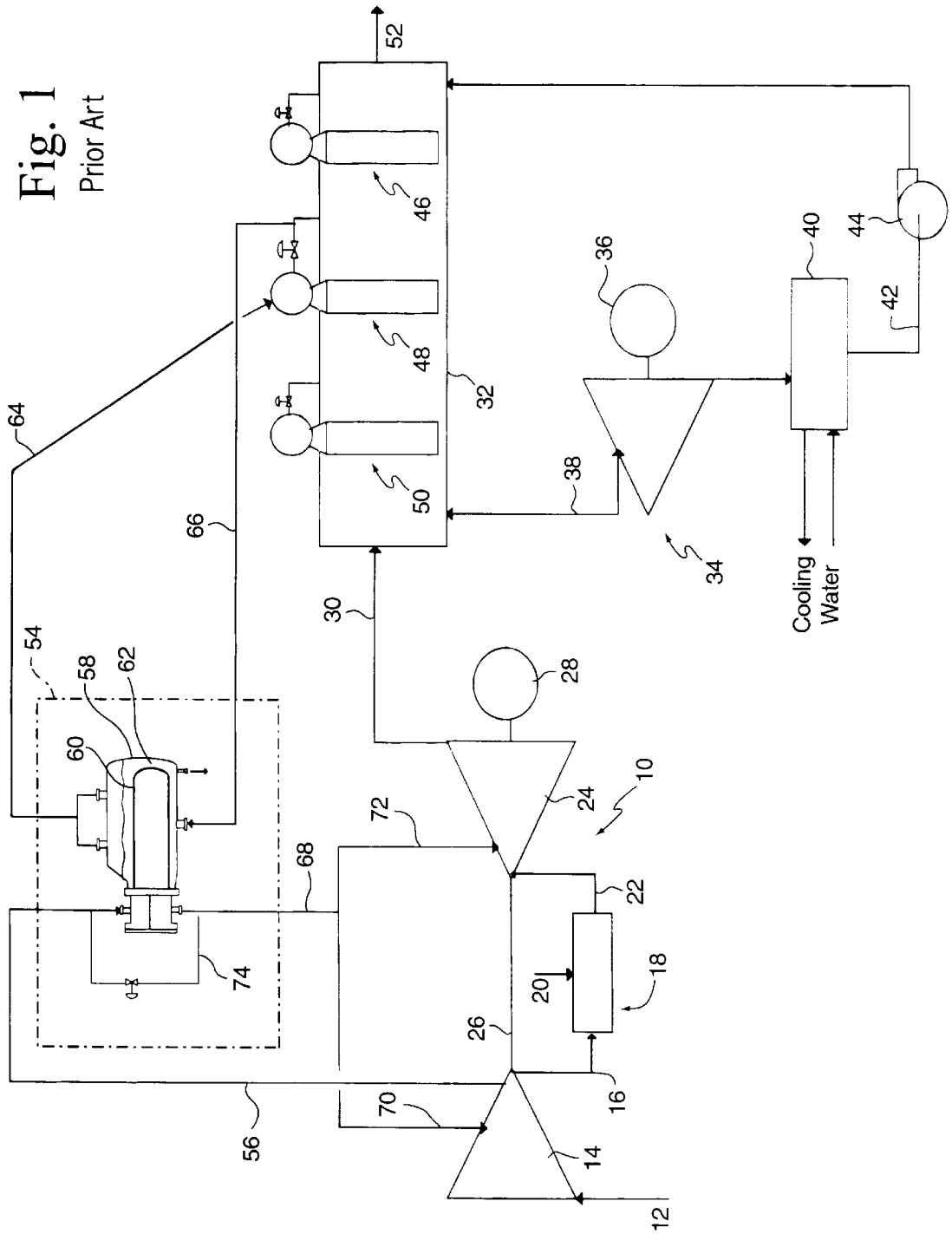
FIG. 1 is a schematic illustration of a combined cycle power plant incorporating a conventional cooled cooling air system.

The further discussion of the inventive system will be generally limited to those components provided or added as an embodiment of the inventive system. The reference numbers shown in FIG. 2, but not discussed hereinbelow are substantially identical to the corresponding components of the FIG. 1 system and are labeled to provide a frame of reference. Components generally corresponding to those illustrated in FIG. 1 but modified according to an embodiment of the invention are labeled with reference numerals similar to those used in FIG. 1 but incremented by 100.

A CCA system 154 embodying the invention includes a shell 158 and tube heat exchanger 160 adapted for water flow inside the tubes and air flow on the shell-side. The airflow is extracted from the compressor and flowed through conduit 156 to air inlet(s) 176 in the shell 158. The hot compressed air flows among and about the heat exchange tubes 160 and the resultant cooled air flows through outlet(s) 178. The cooled air flows via conduit 168 for use as cooling air, as schematically shown by flow paths 170 and 172. A bypass 174 is defined from conduit 156 to 168 to control the cooling air temperature.

In the illustrated embodiment, water enters the heat exchanger at 200 with a small sub-cool (i.e. lower than the saturation temperature), and is partially evaporated in the heat exchanger (10–20% mass fraction). The resultant two phase water/steam flow 202 is then admitted to a separator/flash drum 204, where the steam and water are separated. The saturated steam 164 leaving the separator is admitted to the IP evaporator drum 48 in the HRSG 32. IP economizer discharge water 166 is admitted to the separator as makeup for the steam generated, and this water flow is controlled, e.g., by valve 206, to maintain a constant level (within a tolerance band) in the separator 204.

The separator water 162 is pumped to a higher pressure by re-circulating water pump(s) 208, and admitted to the heat exchanger 158 at 200, as noted above. The pump(s) discharge pressure is selected to be sufficient to overcome the circulating water system pressure drop.

Figure 2:
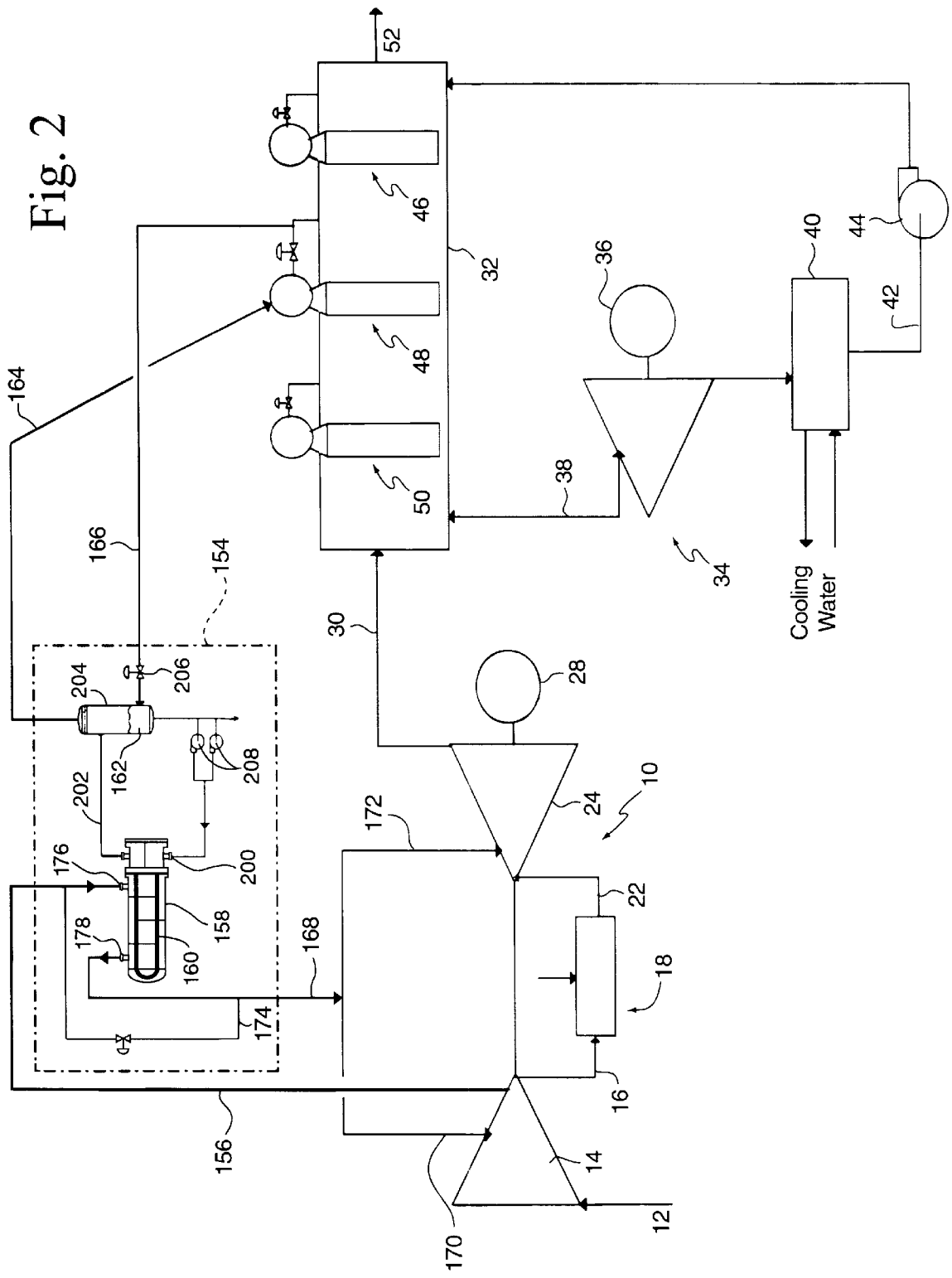
FIG. 2 is a schematic illustration of a combined cycle power plant incorporating a cooled cooling air system embodying the invention.

Air flow outside the tubes allows the use of finned tubes (not illustrated in detail) to reduce the total heat exchanger size. Redundant pumps, e.g. pump 208, are used for increased system reliability. Although a vertical separator 204 is shown in FIG. 2, a horizontal separator can also be used for this application, with the added advantage that a horizontal separation could be stacked on top of the heat exchanger.

In an exemplary embodiment, the water flow rate in the re-circulating water circuit is maintained at a constant rate for the entire gas turbine operating regime, including part load operation. The water flow rate (constant) is selected so that the maximum tube-side water evaporation is limited to approximately 10–20% (i.e. a circulation ratio between 5:1 to 10:1) for the entire gas turbine operating envelope. The maximum evaporation rate is set to ensure two phase flow stability in the system.

The key features/advantages of the system design and controls proposed here over the current systems are as follows:

Providing water on the tube-side eliminates the tube sheet temperature gradient encountered when air flows in the tubes in a kettle re-boiler design. The temperature increase on the tube side of the tube sheet is less than 10° F., and the high temperature drop on the air flow side of the heat exchanger is spread over the entire tube sheet. Thus, a considerable reduction in the stresses on the tube sheet would be expected, with increased life and reliability for the components.

Water level control in the illustrated system is in the separator 204, where there is no boiling, and hence the density of the water can be calculated accurately without the uncertainty of void fraction encountered in a pool of boiling water. This allows accurate water level calculation from measured differential pressure, and level control. While accurate level control is possible, it should be noted that level control is not very critical in the proposed system design since heat exchanger tubes are not immersed in the water, as in the conventional kettle re-boiler.

As noted above, the control method disclosed herein maintains a constant water flow rate in the recirculation water circuit for all operations of the gas turbine, thereby considerably simplifying the control of the system.

Air flow on the shell-side allows extended surface tubes, i.e., fins, to be used, thereby reducing the heat exchanger size and system cost.

Although the description of the system above referred to the production of IP steam 164 with the CCA system, the system can be used to produce HP or LP steam. The pressure level of steam produced will be determined by the air temperature requirements (in/out of the CCA heat exchanger) for the respective application.

It is to be understood that the illustrated assembly is just one example of a power plant to which a CCA system may be applied. In that regard, the combined cycle system could be a multi pressure reheat combined cycle and/or the gas turbine, steam turbine and generator may be arranged in tandem to a single generator on a single shaft rather than the multi shaft configuration shown.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A combined cycle power plant comprising:
   a combustion turbine system having a compressor for producing compressed air, a combustor for combusting a fuel in said compressed air to produce combustion air, and a gas turbine for expanding said combustion air to produce mechanical energy and exhaust gas;
   a steam generator having an inlet for receiving said exhaust air and a plurality of sections located sequentially in a flow path of said exhaust gas for removing heat from said exhaust gas to produce at least one steam flow;
   a steam turbine system for receiving said at least one steam flow; and
   a cooling air flow path for directing a compressed air fraction from said compressor to at least one of said compressor and said gas turbine for cooling a portion thereof;
   wherein said cooling air flow path comprises a heat exchange system for receiving said compressed air fraction and for removing heat therefrom to produce a heated fluid flow and a cooled compressed air flow, wherein said heat exchange system comprises a chamber having a compressed air inlet and a compressed air outlet and at least one tube for flowing water for heat exchange with hot compressed air disposed in said chamber, and
   further comprising a flow separator for separating said heated fluid flow into water for recirculation to said tube in said chamber and a first steam flow, and at least one pump for pumping said water separated by said flow separator to said tube in said chamber.

2. The combined cycle power plant of claim 1, wherein said plurality of sections comprises a first section and a second section, said first section producing a steam flow at a pressure higher than that of said second section.

3. The combined cycle power plant of claim 2, further comprising a first conduit for flowing at least a portion of said heated fluid flow produced by said heat exchange system to said second section.

4. The combined cycle power plant of claim 3, further comprising a second conduit, for supplying feedwater to said heat exchange system from said second section.

5. The combined cycle power plant of claim 1, wherein said at least one tube is a finned tube for increased heat exchange.

6. A combined cycle power plant comprising:
   a combustion turbine operable to burn a fuel to produce mechanical energy and hot exhaust gas;
   a heat recovery steam generator having a plurality of sections and operable to receive said hot exhaust gas and to produce steam at a plurality of pressures;
   a steam turbine operable to receive said steam and to produce mechanical energy; and
   a cooling air flow path for directing a compressed air fraction from a compressor to said combustion turbine for cooling a portion thereof;
   wherein said cooling air flow path comprises a heat exchange system for receiving said compressed air fraction and for removing heat therefrom to produce a heated fluid flow and a cooled compressed air flow, wherein said heat exchange system comprises a chamber having a compressed air inlet and a compressed air outlet and at least one tube for flowing fluid for heat exchange with hot compressed air disposed in said chamber, and
   further comprising a flow separator for separating said heated fluid flow into water for recirculation to said tube in said chamber and a first steam flow, and at least one pump for pumping said water separated by said flow separator to said tube in said chamber.

7. The combined cycle power plant of claim 6, wherein said plurality of sections comprises a first section and a second section, said first section producing a steam flow at a pressure higher than that of said second section.

8. The combined cycle power plant of claim 7, further comprising a first conduit for flowing at least a portion of said heated fluid flow produced by said heat exchange system to said second section.

9. The combined cycle power plant of claim 8, further comprising a second conduit, for supplying feedwater to said heat exchange system from said second section.

10. The combined cycle power plant of claim 7, further comprising a flow path for directing fluid from at least one section of said heat recovery steam generator along a recirculation path outside said heat recovery steam generator and to said second section, wherein said recirculation path comprises said at least one tube for flowing fluid for heat exchange with said hot compressed air disposed in said chamber, to transfer heat to said fluid flow from said compressed air.

11. The combined cycle power plant of claim 7, wherein said at least one tube is a finned tube for increased heat exchange.

12. A method of operating a combined cycle power plant having a combustion turbine system, a heat recovery steam generator, and a steam turbine system, the method comprising the steps of:
   providing a heat exchange system comprising a chamber having a compressed air inlet and a compressed air outlet and at least one tube for flowing water for heat exchange with hot compressed air disposed in said chamber;
   operating said combustion turbine system to burn a fuel to produce hot compressed air, mechanical energy, and a flow of exhaust gas;
   directing a portion of said hot compressed air through said heat exchange system to produce a flow of cooled compressed air and a heated fluid flow; and
   directing said flow of cooled compressed air to cool a portion of said combustion turbine system, wherein said heat exchange system further comprises a flow separator for separating said heated fluid flow into water and a first steam flow and at least one pump for pumping said water separator by said flow separator, and wherein the method further comprises the steps of separating said heated fluid flow into water and said first steam flow and operating said at least one pump to recirculate said water separated by said flow separator to said tube in said chamber.

13. The method of claim 12, further comprising the step of:

providing feedwater for said heat exchange system from said heat recovery steam generator.

14. The method of claim 13, wherein said heat recovery steam generator has a high pressure section, an intermediate pressure section, and a low pressure section, and the step of providing feedwater comprises providing feedwater from said intermediate pressure section.

15. The method of claim 14, further comprising the step of directing said first steam flow to said intermediate pressure section of said heat recovery steam generator.

* * * * *